United States Patent [19]
Harper

[11] Patent Number: 5,055,496
[45] Date of Patent: Oct. 8, 1991

[54] POLYMER PRODUCT CONTAINING ISOBUTYLENE OXIDE POLYOLS

[75] Inventor: Stephen D. Harper, West Chester, Pa.

[73] Assignee: Arco Chemical Technology, Inc., Wilmington, Del.

[21] Appl. No.: 634,845

[22] Filed: Dec. 27, 1990

Related U.S. Application Data

[62] Division of Ser. No. 310,187, Feb. 14, 1989, Pat. No. 5,003,111.

[51] Int. Cl.$^5$ ............... C08G 18/48; C08G 59/62; C08G 63/668; C08G 63/672
[52] U.S. Cl. .................... 521/174; 528/76; 528/77; 528/110; 528/272; 528/300; 528/301; 528/406; 528/418
[58] Field of Search ............ 521/174; 528/76, 77, 528/110, 272, 300, 301, 406, 418

[56] References Cited

U.S. PATENT DOCUMENTS

| | | | |
|---|---|---|---|
| 3,374,277 | 3/1968 | Vandenberg | 528/76 |
| 4,743,244 | 5/1988 | LeKhac | 525/186 |
| 4,849,126 | 7/1989 | Kud et al. | 525/48 |

Primary Examiner—Maurice J. Welsh
Assistant Examiner—Rabon Sergent
Attorney, Agent, or Firm—Stephen D. Harper

[57] ABSTRACT

Novel polyether polyols are disclosed which contain an internal block of isobutylene oxide or a mixture of isobutylene oxide and a mono- or unsaturated alkylene oxide and an end-cap of a mono- or unsubstituted alkylene oxide to provide reactive primary or secondary hydroxyl end-groups. The polyether polyols are useful intermediates in the production of segmented elastomers. A process for the preparation of the novel polyols is also described in which an alkali metal catalyst and a crown ether cocatalyst are employed to afford polyols containing relatively low levels of unsaturation.

14 Claims, No Drawings

POLYMER PRODUCT CONTAINING ISOBUTYLENE OXIDE POLYOLS

This is a division of application Ser. No. 07/310,187 filed on Feb. 14, 1989, now U.S. Pat. No. 5,003,111.

This invention relates to novel polyethers containing isobutylene oxide. More particularly, this invention pertains to isobutylene oxide polyether polyols having hydroxyl end-groups which are predominantly primary or secondary and which render the polyether polyols reactive towards electrophilic functional groups.

BACKGROUND OF THE INVENTION

Polyether polyols are useful as intermediate in the preparation of polyurethanes. In addition, polyether polyols are commonly used directly in other applications and may be employed as functional fluids and surfactants, for example.

Typically, polyether polyols are prepared by polymerizing a mono- or unsubstituted alkylene oxide such as ethylene oxide, propylene oxide, or 1,2-butylene oxide using base catalysis or by polymerizing an oxolane such as tetrahydrofuran using acid catalysis. The properties of the polyether polyols may be controlled by varying the chemical structure of the monomers, the order and arrangment of the monomers in the polyol, the polyol molecular weight, and the average functionality of the polyol.

To date, only a limited variety of polyether polyols containing isobutylene oxide, a di-substituted alkylene oxide, have been prepared. This is due to the difficulties associated with polymerizing this monomer while retaining control of molecular weight and end-group functionality.

U.S. Pat. No. 3,374,277 teaches crystalline, high-melting isobutylene oxide diols having a molecular weight of 500 to 20,000. The diols are obtained by the alkyl lithium promoted cleavage of very high molecular weight isobutylene oxide homopolymers. The predominantly head-to-tail arrangement of the isobutylene oxide units in the high molecular weight homopolymers and the mechanism of cleavage result in the diol products having approximately 50% tertiary hydroxyl end-groups and 50% primary hydroxyl end-groups. It is well-known that tertiary hydroxyl groups are much less reactive towards electrophilic functional groups such as isocyanates than are primary or secondary hydroxyl groups. Thus, the isobutylene oxide diols taught by this reference would be difficult to incorporate into polyurethane using conventional methods and techniques, since chain extension will be slow compared to polyols containing predominantly primary or secondary hydroxyl end-groups. Furthermore, precise control of molecular weight and molecular weight distribution is difficult using this method due to the random nature of the cleavage process. Isobutylene oxide polyols having a functionality (average number of hydroxyl groups per polymer chain) higher than two cannot be prepared by the process taught in this reference.

EP No. 173,879 teaches polyether polyols having an internal block of a mono-substituted alkylene oxide such as propylene oxide and an end-cap consisting of a limited number of isobutylene oxide monomer units. These polyols have only tertiary hydroxyl end-groups, which, for the reasons discussed previously, are normally undesirable when formulating polyurethanes.

An object of the present invention is to provide isobutylene oxide polyether polyols which cannot be made by prior processes.

More specifically, an object of the invention is to provide polyether polyols having internal blocks comprised of either isobutylene oxide or a random mixture of isobutylene oxide and a mono- or unsubstituted alkylene oxide and having one or more endcaps of a mono- or unsubstituted alkylene oxide to provide primary or secondary hydroxyl groups reactive with electrophilic functional groups.

A further object of the invention is to provide a process for producing such isobutylene oxide polyether polyols which is relatively straight forward and permits good control of polyol molecular weight, molecular weight distribution, composition, functionality, and physical and chemical properties.

SUMMARY OF THE INVENTION

The present invention provides a polyether comprised of from about 10 to 90 mole percent of isobutylene oxide and from about 90 to 10 mole percent of an alkylene oxide selected from the group consisting of ethylene oxide and mono-substituted alkylene oxides, wherein the polyether has at least one hydroxyl end-group, the hydroxyl end-group is primary, secondary, or tertiary and the ratio $$\frac{\text{primary} + \text{secondary}}{\text{total hydroxyl}}$$

is greater than about 0.50.

Additionally, the present invention provides a process for producing such a polyether comprising the steps of (a) polymerizing isobutylene oxide or a mixture of isobutylene oxide and first portion of an alkylene oxide selected from the group consisting of ethylene oxide and mono-substituted alkylene oxides in the presence of a crown ether, an active hydrogen-containing initiator, and an amount of an alkali metal effective to form an intermediate polymer having at least one hydroxy or alkoxy end-group and (b) reacting the intermediate polymer and a second portion of an alkylene oxide selected from the group consisting of ethylene oxide and mon-substituted alkylene oxides to form the polyether.

DETAILED DESCRIPTION OF THE INVENTION

Isobutylene oxide is a di-substituted alkylene oxide, having two methyl groups attached to the same carbon. As a result of this structure, an isobutylene oxide homopolymer of reasonably high molecular weight is a highly crystalline thermoplastic having a melt temperature of 160°-170° C. In contrast, mono-substituted alkylene oxides such as propylene oxide homopolymerize using base or acid catalysis yield to yield amorphous polyethers with low (−50° to −80° C.) glass transition temperatures. Therefore, random copolymers of isobutylene oxide and a mono-substituted alkylene oxide would be expected to exhibit properties intermediate between those displayed by the homopolymers of each monomer. By varying the relative proportions of the two monomers, the properties may be adjusted to meet the requirements of particular applications.

For example, it is well-known that the strain-induced crystallization exhibited by certain polyether polyols such as poly(tetrahydrofuran) contributes to improved tensile properties when the polyols are incorporated into polyurethanes or other segmented elastomers. However, to function effectively as a rubbery soft segment in the segmented elastomer, the polyol should not be highly crystalline. Random copolymers of isobutylene oxide and a less substituted alkylene oxide, the crystallinity of which may be altered by varying the amount of mono- or unsubstituted alkylene oxide used, therefore are expected to provide unique properties in a segmented elastomer which cannot be obtained using either isobutylene oxide homopolymer diols or mono- or unsubstituted alkylene oxide homopolyols.

However, to be useful as a segmented elastomer intermediate, a polyol must have hydroxyl end-groups which are sufficiently reactive with electrophilic functional groups under normal processing conditions to permit chain extension. Polyol chain ends which are not reacted with electrophilic functional groups not only limit the molecular weight of the segmented elastomer formed but also disrupt the phase separation of the elastomer. Relatively high molecular weight and complete phase separation are both necessary to develop optimum physical properties.

The novel polyether polyols of this invention are comprised of an internal block and at least one end-cap which provides a primary or secondary hydroxy group reactive with an electrophilic functional group such as an isocyanate. The internal block is comprised of either isobutylene oxide or a mixture of isobutylene oxide and a less substituted alkylene oxide. The end-cap is comprised of ethylene oxide or a mono-substituted alkylene oxide. Examples of suitable mono-substituted alkylene oxides include propylene oxide, 1,2-butylene oxide, allyl glycidyl ether, and phenyl glycidyl ether. The mono- or unsubstituted alkylene oxide in the end-cap(s) may be the same as or different from the mono- or unsubstituted alkylene oxide in the internal block. Mixtures of mono- or unsubstituted alkylene oxides may be used. The polyether as a whole may be comprised of from about 10 to 90 mole percent of isobutylene oxide and from about 90 to 10 mole percent of the mono- or unsubstituted alkylene oxide(s). In a preferred embodiment, the polyether is comprised of from about 25 to 75 mole percent isobutylene oxide and from 75 to 25 mole percent of propylene oxide and has at least two hydroxyl end-groups.

The polyether polyols may be of any suitable molecular weight. For polyurethane applications, the number average molecular weight preferred will be from about 250 to 10,000. Most preferably, the molecular weight will range from about 500 to 6,000. The relative molecular weights of the internal block and the end-cap(s) can vary, but in general it is preferred that the internal block containing the isobutylene oxide comprise the majority by weight of the total polyol. The relative proportion of the internal block and the end-cap(s) should be such that the ratio of $$\frac{\text{primary + secondary}}{\text{total hydroxyl}}$$

is at least about 0.50. Higher ratios are preferred in order to obtain a polyol which is more highly reactive towards electrophilic functional groups. It may be difficult to achieve quantitative end-capping (i.e., a ratio of 1.00). However, polyols with ratios of from about 0.60 to 0.90 are generally satisfactory for use as segmented elastomer components.

The polyether polyols of this invention may be linear or branched. Branching may be introduced by the use of an active hydrogen-containing initiator having a functionality greater than two or by the introduction of a multi-functional monomer such as a diepoxide during the polymerization to link growing polyol chains together. Although preferably the internal block has a substantially random structure when the isobutylene oxide is copolymerized with another alkylene oxide, it may be desirable to vary the sequence of the monomer units to alter the properties of the resulting polyether polyol. For example, the internal block may itself contain smaller blocks in which the relative proportions of isobutylene oxide and the alkylene oxide are varied. Methods of accomplishing such variations will become apparent from the description of the preferred process used for the preparation of the polyols.

Although the polyether polyols of this invention contain at least one hydroxyl end-group per polymer chain, the average functionality of the product may be increased as desired. Polyols having an average functionality of two (diols) of three (triols) are most preferred, particularly for polyurethane applications. Small amounts of monol may be present in a polyol having a theoretical functionality of two or more due to the tendency of the alkylene oxides to isomerize to allylic alcohols under basic conditions. The allylic alcohols can serve as competing initiators.

The process for the preparation of the polyether polyols of this invention involves a first step in which isobutylene oxide is either homopolymerized or copolymerized with a mono- or unsubstituted alkylene oxide in the presence of an active hydrogen-containing initiator, an alkali metal, and a crown ether.

The active hydrogen-containing initiator may be any of the compounds known in the art to be suitable for the preparation of conventional polyether polyols by base catalysis. Examples of preferred initiators include alcohols such as methanol, isopropyl alcohol, and 1,2-pentanediol, water, vicinal glycols such as ethylene glycol, propylene glycol, and pinacol, glycol oligomers such as diethylene glycol, tripropylene glycol, and other low molecular weight alkylene oxide oligomers, as well as trifunctional compounds such as trimethylol propane, glycerin, and their alkoxylated derivatives. Amines, phenols, and thiols may also be useful initiators. The type of initiator used is not critical, although the average functionality of the polyether polyol product will be largely determined by the functionality of the initiator employed. The initiator should be capable of forming a salt with an alkali metal. The number average molecular weight of the polyether polyol will depend on the relative amounts of alkylene oxide and initiator in accordance with the following formula:

$$Mn = \frac{\text{wt. initiator + wt. alkylene oxide}}{\text{moles initiator}}$$

The alkali metal may be any of the alkali metals which effectively catalyze the polymerization of alkylene oxides. Potassium and sodium are particularly preferred. The alkali metal may be derived from any suitable source, including alkali metal hydroxides, alkoxides, phenoxides and the like. The alkali metal itself (for example, a sodium metal dispersion) may be used. In a preferred embodiment, an alkali metal hydroxide is combined with the initiator prior to polymerization and reacted to form an alkoxide (the alkali metal salt of the initiator). It is desirable to remove the water formed in this reaction; suitable methods include azeotropic distillation and vacuum stripping. The amount of alkali metal used can be varied as desired, with the rate of polymerization being generally dependent on the alkali metal concentration. The mole ratio of alkali metal to active hydrogen in the initiator preferably varies from about 1:100 to 2:1. Most preferably, the ratio is between about 1:20 and 1:2.

The crown ether is used as a cocatalyst with the alkali metal and serves to greatly increase the rate of polymerization. Due to its disubstitution, isobutylene oxide is difficult to polymerize to any appreciable molecular weight with retention of theoretical functionality using an alkali metal alone since the rate of chain growth relative to the rate of isobutylene oxide isomerization to methallyl alcohol is not favorable. Without the crown ether, unacceptably high levels of unsaturation, reflecting a high proportion of monol, are produced in the polyether polyol product if reaction temperatures sufficient to cause reasonably rapid monomer conversion are used.

Suitable crown ethers include any of the macrocyclic heteroatom-containing ligands known to complex with alkali metals. In general, such crown ethers may be represented by the structural formula:

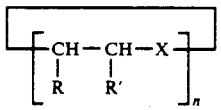

where n is an integer from 4 to 10, each R and R' taken alone or in combination are hydrogen, aryl, or alkyl, and R and R' in any or all of the n units may be joined together to form a benzene or cycloalkane ring of 5 to 7 members, and X is sulfur, oxygen, or tertiary amino group. The identity of X in the n units may vary (i.e., a crown ether may contain oxygen as well as sulfur). In addition, any of the n units may have move than two carbon atoms between the X heteroatoms. Carbonyl groups may also be present in the macrocycle. Bicyclic compounds having nitrogen bridgehead atoms and having in the hydrocarbon bridging chains at least two additional heteroatoms selected from the group consisting of oxygen, sulfur, and tertiary amino are also suitable for use as the crown ether in the process of this invention. Such bicyclic compounds are sometimes referred to as "cryptates". Specific examples of suitable and readily available crown ethers include 12-crown-4, 15-crown-5, 18-crown-6, 21-crown-7, dibenzo-18-crown-6, 2.2.2-cryptate, and dicyclohexano-18-crown-6. Mixtures of crown ethers may be used. Polymer- or substrate-bound crown ethers are also suitable for use in the process of this invention. Substrate-bound crown ethers may be prepared using an insoluble inorganic substrate such as alumina or silica gel, as described in Bradshaw, et al *J. Org. Chem* 53,3190 (1988) and Bradshaw, et al *J. Chem Soc., Chem Commun.* 812 (1988). An example of a polymer-bound crown ether is the condensation product of formaldehyde and dibenzo-18-crown-6, which is available commercially from Fluka Chemical. Additional polymer-bound crown ethers suitable for use in the process of this invention are described in Blasius, et al *J. Chromatography* 201, 147 (1980). The use of a polymer- or substrate-bound crown ether will facilitate the recovery of the crown ether from the final polymerization reaction mixture.

The molar ratio of crown ether to alkali metal can vary from about 1:50 to 5:1, with the range of 1.5:1 to 1:4 being preferred. A 1:1 molar stoichiometry is most preferred in order to obtain an optimum rate of polymerization with a minimum amount of alkylene oxide isomerization.

Typically, the polymerization of the alkylene oxide(s) is carried out at a temperature of from about 30° to 120° C. In general, higher reaction temperatures will result in increased rates of monomer conversion and polymerization while lower temperatures will decrease the amount of unsaturation in the polyol product. For these reasons, the preferred polymerization temperature range is from 50° to 80° C. Depending on the temperature and the volatility of the monomer(s) employed, the reaction pressure may be atmospheric, subatmospheric, or above atmospheric.

It may be advantageous to carry out the polymerization of the alkylene oxide(s) in the presence of an inert solvent to dissolve or to reduce the viscosity of the polyol product. This is particularly desirable when preparing a polyol having a high isobutylene oxide content at relatively low temperature, since such a product may tend to solidify in the absence of solvent. Aromatic hydrocarbons such as toluene and ethers such as tetrahydrofuran are examples of suitable solvents. Bulk polymerization may be used when the polyol product is substantially liquid at the reaction temperature. It is preferred that the polyol reaction mixture be stirred and that the monomer(s) be added in a continuous fashion to the mixture.

After polymerization of the isobutylene oxide, alone or in combination with a less-substituted alkylene oxide, to form the internal block, the intermediate polymer is reacted with ethylene oxide or a mono-substituted alkylene oxide to yield an end-capped polyether polyol. The mono-substituted alkylene oxide may be the same as or different from the comonomer in the internal block. Propylene oxide is the preferred alkylene oxide to be used in the end-capping step.

In general, the reaction conditions employed during the end-capping step may be the same as those used to form the internal block. Removal of any small amounts of isobutylene oxide remaining after formation of the internal block prior to the end-capping step is preferred.

The amount of ethylene oxide or mono-substituted alkylene oxide to be added to produce the end-cap will vary depending upon the molecular weight and functionality of the intermediate polymer. However, in order to obtain a polyether polyol product having terminal hydroxyl groups which are at least 50% primary and/or secondary, generally at least about 5 equivalents of the alkylene oxide per equivalent of hydroxyl endgroup is preferably used. A higher $$\frac{\text{primary + secondary hydroxyl}}{\text{total hydroxyl}}$$

ratio can be achieved by increasing the equivalents of alkylene oxide used.

After the end-capping step, the crude polyether polyol may be stripped to remove any remaining unreacted alkylene oxide and then treated to separate the alkali metal and crown ether from the product. Any method known in the art for neutralizing a polyether polyol prepared using base catalysis is suitable, including water-washing and acid precipitation.

It has been found that contacting the crude polyol with an adsorption agent such as magnesium silicate effectively reduce the alkali metal and crown ether content of the product to acceptable levels. Typically, from about 1 to 5 parts by weight of the adsorption agent are contacted with 100 parts by weight of the polyol for about 1 to 5 hours at a temperature of from about 90° to 130° C. The treated polyol is then filtered to remove the adsorption agent containing the alkali metal and crown ether.

Because the polyether polyols of this invention can have two or more terminal hydroxyl groups per polyol chain, the majority of which are primary and/or secondary, they may be used in various chain extension reactions to form useful high molecular weight polymer products. These novel polyether polyols are suitable for use in any of the chain extension reactions in which conventional polyether polyols are employed and which are well-known to those skilled in the art. The chain extension agent can be a polyfunctional compound containing electrophilic functional groups which react under appropriate conditions of temperature, pressure, and catalyst with the hydroxyl groups of the polyol. Such agents include di- or polyisocyanates, di- or polyanhydrides, and di- or polyepoxides. Useful polyester and polyamide block copolymers may also be formed with these polyether polyols using any of the known condensation polymerization techniques. Thus, the polyether polyols of this invention may serve as intermediates in the preparation of a wide variety of thermoplastic resins, thermoset resins, elastomers, foams and the like.

The polyether polyols of this invention may also find utility as surfactants, dispersing agents, foam stabilizers, adhesives, and functional fluids.

The invention is further illustrated, but not limited, by the following examples.

EXAMPLES

Preparation of Isobutylene Oxide Polyols - General Procedure

Isobutylene oxide (BASF) was purified by fractional distillation from calcium hydride through a 12" column packed with ⅛ glass helices. Propylene oxide (ARCO Chemical) was purified by distillation from calcium hydride. 18-Crown-6 (Aldrich) was purified by recrystallization from acetonitrile.

In general, the polymerizations were performed in a multi-neck round bottom flask equipped with reflux condenser, addition funnel, mechanical stirrer, nitrogen bubbler, and heating mantle. Crown ether, initiator, potassium hydroxide, and toluene were charged to the flask and water removed by azeotropic distillation using a Dean-Stark trap. In examples performed without solvent, the remaining toluene was then removed under reduced pressure. Isobutylene oxide or a mixture of isobutylene oxide and propylene oxide were added to the stirred mixture while maintaining a constant internal temperature (Step 1). The rate of addition was adjusted so that vigorous refluxing of unreacted epoxide was avoided. After addition was completed (generally ca. 8-12 hours), the mixture was heated for at least another 12 hours.

Any unreacted epoxide was then removed under reduced pressure and propylene oxide added to end-cap the polyol (Step 2). After reacting at least 12 hours, the product was stripped again and treated with 4% magnesium silicate (Magnesol ®, a product of the Reagent Chemical Co.), 0.5% water, and 1% diatomaceous earth filter-aid (Celite Filter Aid ®, a product of the Johns Manville Co.) for 4 hours at 110° C. to remove potassium hydroxide and crown ether. The polyol was then filtered through diatomaceous earth filter-aid at 70° C., diluted further with toluene, and treated with 500 ppm BHT. In most cases, the toluene solution was also washed with water several times to assure complete catalyst removal, although this did not appear to be necessary. The final polyol was obtained by vacuum stripping to remove solvent and water.

The exact reaction conditions and quantities of reactants used in each example are given in Table I, as well as the analytical data obtained for each product. The polyether polyols were characterized by conventional analytical methods. Gel permeating chromatography was conducted using polypropylene glycol calibration standards. The composition of the polyols (% PO, %IBO) was determined by $^{13}C$ nuclear magnetic resonance. The ratio $$\frac{1° + 2° \text{ hydroxyl}}{\text{total hydroxyl}}$$

was assumed to be equal to $$\frac{\text{hydroxyl no., found}}{\text{hydroxyl no., calc.}},$$

where the calculated hydroxyl number is equal to $$\frac{F \times 1000 \times 56.1}{Mn, \text{ cal.}}$$

$$\left( F = \text{initiator functionality, Mn, cal.} = \frac{\text{wt. polyol}}{\text{moles initiator}} \right)$$

The wet chemical method used to measure hydroxyl number did not detect tertiary hydroxyl groups.

Example 1 demonstrates the preparation of a triol using a propoxylated glycerin initiator and a 1:1 molar ratio of 18-crown-6 and potassium hydroxide. All of the propylene oxide was added in step 1, yielding a polyol in which nearly all of the hydroxyl end-groups were tertiary.

Examples 2 and 3 also illustrate the preparation of a triol using a propoxylated glycerin initiator, but in these examples the polyols were end-capped with propylene oxide. Approximately 70-80% of the hydroxyl groups in the final products were primary and/or secondary. Relatively low levels of unsaturation were observed.

Examples 4-8 and 10-11 demonstrate the preparation of diols having molecular weights of about 2000 in which the internal blocks contain from about 68 to 100 weight percent isobutylene oxide. Each diol was end-capped with propylene oxide to provide polyols in which the majority of the hydroxyl groups are primary and/or secondary. The low levels of unsaturation indicate that the functionalities of the polyols are close to the expected value of 2.0. The diols containing high amounts (95-100 percent) of isobutylene oxide in the internal block were waxy solids, while the diols containing less isobutylene oxide were substantially liquid at room temperature.

The diol of Example 8 was used in the preparation of cast urethane elastomers as described below.

Example 9 is a comparative example in which an isobutylene oxide/propylene oxide polyol was prepared without the use of a crown ether cocatalyst. Even after a total reaction time of 37.5 hours at a temperature of 110° C., only 70% conversion of the monomers was achieved. The unsaturation level of the product was 0.256 meg/g, considerably higher than that observed for polyethers of similar composition prepared using a crown ether cocatalyst. The functionality of the product was therefore significantly less than the expected value of 2.0. The molecular weight as measured by GPC was also much lower than expected.

TABLE I

PREPARATION OF ISOBUTYLENE OXIDE POLYOLS

| | EXAMPLE # | | | | | |
|---|---|---|---|---|---|---|
| | 1 | 2 | 3 | 4 | 5 | 6 |
| Initiator | A | B | A | 1,4-Butanediol | 1,4-Butanediol | 1,4-Butanediol |
| g | 48.0 | 76.36 | 48.0 | 12.29 | 12.29 | 12.29 |
| moles | 0.10 | 0.0429 | 0.10 | 0.136 | 0.136 | 0.136 |
| 85% KOH, g | 1.98 | 1.98 | 1.98 | 1.98 | 1.98 | 1.98 |
| 18-Crown-6, g | 8.39 | 7.93 | 7.93 | 7.93 | 7.93 | 7.93 |
| Step 1 | | | | | | |
| IBO, g | 123.08 | 135.11 | 101.24 | 148.50 | 66.25 | 113.97 |
| wt. % | 49.0 | 74.5 | 100 | 100 | 100 | 68 |
| PO, g | 127.93 | 46.36 | — | — | — | 40.38 |
| wt. % | 51.0 | 25.5 | — | — | — | 24 |
| Mn, calc. | 2990 | 6010 | 1490 | 1180 | 580 | 1220 |
| Step 2 | | | | | | |
| PO, g | — | 48.37 | 159.84 | 225.41 | 223.10 | 136.93 |
| Mn, calc. | — | 7140 | 3090 | 2840 | 2220 | 2230 |
| Solvent (g) | — | — | — | THF (20) | Toluene (43) | Toluene (43) |
| Temp., °C. | 50 | 50→90 | 50→75 | 60→80 | 70 | 60 |
| Yield, g, calc. | 299.01 | 306.20 | 309.08 | 386.20 | 301.64 | 303.57 |
| Found | n.d. | 268.52 | 265.38 | 284.94 | 294.43 | 252.66 |
| Mn (based on yield) | — | 6260 | 2650 | 2100 | 2170 | 1860 |
| Hydroxyl # Found | n.d. | 21.4 | 46.1 | 45.8 | 46.2 | 47.6 |
| Calc. | n.d. | 26.9 | 63.5 | 53.6 | 51.7 | 60.3 |
| Mn, GPC | 1760 | 3430 | 2220 | 1590 | 1580 | 1510 |
| Mw/Mn, GPC | 1.18 | 1.64 | 1.21 | 1.24 | 1.24 | 1.20 |
| Viscosity, cps | 660 (25° C.) | 1240 (50° C.) | 900 (25° C.) | Wax | 490 (25° C.) | 550 (25° C.) |
| Mole % PO, Calc. | 56 | 55 | 64 | 58 | 74 | 58 |
| Found | 90 | 85 | 58 | 70 | 78 | 67 |
| Mole % IBO, calc. | 41 | 44 | 33 | 39 | 22 | 38 |
| Found | 10 | 15 | 42 | 30 | 22 | 33 |
| Unsat., meq/g | 0.023 | 0.100 | 0.039 | 0.051 | 0.043 | 0.043 |
| K, ppm | 16 | <2 | <2 | <2 | <2 | <2 |
| 1° + 2° hydroxyl / total hydroxyl | — | 0.80 | 0.73 | 0.85 | 0.89 | 0.80 |

| | EXAMPLE # | | | | |
|---|---|---|---|---|---|
| | 7 | 8 | 9c | 10 | 11 |
| Initiator | 1,4-Butanediol | TPG | TPG | 1,4-Butanediol | 1,4-Butanediol |
| g | 14.34 | 174.5 | 54.95 | 26.63 | 26.63 |
| moles | 0.159 | 0.909 | 0.286 | 0.295 | 0.295 |
| 85% KOH, g | 1.98 | 11.31 | 3.34 | 3.29 | 3.29 |
| 18-Crown-6, g | 7.93 | 45.31 | — | 13.19 | 13.19 |
| Step 1 | | | | | |
| IBO, g | 131.08 | 731.6 | 220 | 328.96 | 346.92 |
| wt. % | 69 | 80 | 79 | 100 | 95 |
| PO, g | 45.32 | 181.8 | 57 | — | 18.31 |
| wt. % | 24 | 20 | 21 | — | 5 |
| Mn, calc. | 1200 | 1200 | 1200 | 1200 | 1330 |
| Step 2 | | | | | |
| PO, g | 166.02 | 925.7 | 279 | 305.96 | 293.60 |
| Mn, calc. | 2240 | 2220 | 2210 | 2240 | 2320 |
| Solvent (g) | — | — | — | Toluene (50→150) | — |
| Temp., °C. | 60 | 60 | 110 | 60→80 | 60→70 |
| Yield, g, calc. | 356.76 | 2013.6 | 611 | 661.55 | 685.46 |
| Found | 307.22 | 1828.9 | 428 | n.d. | 655.57 |
| Mn (based on yield) | 1930 | 2010 | 1550 | — | 2220 |
| Hydroxyl # Found | 43.4 | 42.6 | 47.0 | 42.8 | 34.5 |
| Calc. | 58.1 | 55.8 | 72.4 | n.d. | 50.5 |
| Mn, GPC | 1540 | 1610 | 560 | 1480 | 1730 |
| Mw/Mn, GPC | 1.24 | 1.30 | 1.43 | 1.31 | 1.23 |
| Viscosity, cps | 686 (25° C.) | 700 (25° C.) | 390 (25° C.) | Solid | Solid |
| Mole % PO, Calc. | 59 | 64 | 60 | 48 | 53 |
| Found | 63 | 63 | 55 | 49 | 39 |
| Mole % IBO, calc. | 37 | 36 | 40 | 52 | 47 |
| Found | 37 | 37 | 45 | 51 | 61 |
| Unsat., meq/g | 0.044 | 0.043 | 0.256 | 0.035* | n.d.* |

TABLE I-continued

PREPARATION OF ISOBUTYLENE OXIDE POLYOLS

| K, ppm | <2 | <2 | n.d. | <2 | <2 |
|---|---|---|---|---|---|
| 1° + 2° hydroxyl / total hydroxyl | 0.75 | 0.76 | 0.65 | n.d. | 0.68 |
|  |  |  |  | n.d. |  |

NOTES TO TABLE I
*not completely soluble during analysis
A = polypropylene glycol triol (propoxylated glycerin, MW = 480)
B = polypropylene glycol triol (propoxylated glycerin, MW = 1780)
TPG = tripropylene glycol
n.d. = not determined
c = comparative example

Preparation of Cast Urethane Elastomers - General Procedure

The isobutylene oxide polyol of example 8 was reacted with MDI [methylene bis-(phenyl isocyanate), purified before use by hot filtration) to form a prepolymer by charging the molten MDI to a 250 mL resin kettle equipped with thermometer and mechanical stirrer, adding the warm polyol by syringe, and reacting the mixture for 4 hours at 120° C. under a nitrogen atmosphere. After degassing the prepolymer briefly, the chain extender was added. When ethylene glycol was used as a chain extender, 13 ppm (based on total weight of the formulation) T-12 ® catalyst (a product of M&T Chemical) was added with the chain extender. The mixture was stirred vigorously until it turned opaque and more viscous (generally 1-15 minutes) and then poured into a ⅛"×5"×10" room temperature aluminum mold. The plaques were cured in a 120° C. press under 10 tons pressure, demolded, and cured overnight (16 hrs.) in a 100° C. oven. Details of the preparation appear in Table II. The properties of the cast urethane plaques were determined by standard ASTM methods and are reported in Table II. The NCO index was determined from the calculated hydroxyl number of the polyol.

hydrides, polyanhydrides, diepoxides, and polyepoxides; and b) a polyester polyol comprised of
  i) an internal block of isobutylene oxide and, optionally, a first less substituted alkylene oxide selected from the group consisting of ethylene oxide and mono-substituted alkylene oxides; and
  ii) at least two end-caps of a second less substituted alkylene oxide selected from the group consisting of ethylene oxide and mono-substituted alkylene oxides, which may be the same as or different from the first less substituted alkylene oxide;

wherein the amount of isobutylene oxide in the polyether polyol as a whole is from about 10 to 90 mole percent and the total amount of first and second less substituted alkylene oxide is from about 10 to 90 mole percent, the polyether polyol has at least two hydroxyl end-groups, the hydroxyl end-groups are primary, secondary, or tertiary, and the ratio $$\frac{\text{primary} + \text{secondary}}{\text{total hydroxyl}}$$

TABLE II

PREPARATION OF CAST URETHANE ELASTOMERS

| | Example # | | | |
|---|---|---|---|---|
| | 12 | 13 | 14 | 15 |
| Polyol | Example 8 | Example 8 | Example 8 | Example 8 |
| g | 98.21 | 98.71 | 99.05 | 98.67 |
| Isocyanate | MDI | MDI | MDI | MDI |
| g | 52.44 | 52.44 | 55.93 | 55.93 |
| Chain-Extender | 1,4-Butanediol | 1,4-Butanediol | Ethylene Glycol | Ethylene Glycol |
| g | 13.57 | 13.56 | 9.97 | 10.02 |
| Catalyst (ppm) Chain Extender | — | — | T-12 ® (13) | T-12 ® (13) |
| Addition Temp. °C. | 80 | 80 | 50 | 35 |
| % Hard Segment | 40.2 | 40.1 | 40.0 | 40.1 |
| NCO Index | 1.05 | 1.05 | 1.06 | 1.06 |
| Hardness | 88 (A) | 88 (A) | 88 (A) | 88 (A) |
| Tensile Strength | 2270 | 2380 | 2370 | 2430 |
| 100% Modulus | 1210 | 1200 | 1320 | 1280 |
| 300% Modulus | 1840 | 1830 | 2160 | 2060 |
| % Elongation | 430 | 490 | 343 | 383 |
| Comp. Set (70° C.), % | 37 | 36 | 29 | 32 |
| Tear Strength | 370 | 380 | 399 | 402 |
| % Rebound | 36 | 41 | 41 | 36 |
| Flex Stress (5% Strain) | 210 | 240 | 213 | 271 |
| Tg, °C. (DMA) | −16 | −3 | — | — |
| (DSC) | −27 | −28 | −26 | −22 |

I claim:

1. A high molecular weight polymer product comprising the reaction product of
   a) a chain extension agent selected from the group consisting of diisocyanates, polyisocyanates, dianis greater than about 0.50.

2. The high molecular weight polymer product of claim 1 wherein the chain extension agent is a diisocyanate.

3. The high molecular weight polymer product of claim 1 wherein the chain extension agent is a polyisocyanate.

4. The high molecular weight polymer product of claim 1 wherein the polyether polyol has two hydroxl end-groups.

5. The high molecular weight polymer product of claim 1 wherein the first and second less substituted alkylene oxides are each propylene oxide.

6. The high molecular weight polymer product of claim 1 wherein the number average molecular weight of the polyether polyol is from about 500 to 6,000.

7. The high molecular weight polymer product of claim 1 wherein the amount of isobutylene oxide in the polyether polyol as a whole is from about 25 to 75 mole percent and the total amount of first and second less substituted alkylene oxide in the polyether polyol is from about 25 to 75 mole percent.

8. The high molecular weight polymer product of claim 1 wherein the ratio $$\frac{\text{primary + secondary}}{\text{total hydroxyl}}$$

in the polyether polyol is from about 0.60 to 0.90.

9. A polyurethane comprising the reaction product of
a) a chain extension agent selected from the group consisting of diisocyanates and polyisocyanates; and
b) a polyether polyol having a number average molecular weight of from about 500 to 6,000 which is comprised of
   i) an internal block of isobutylene oxide and, optionally, propylene oxide; and
   ii) at least two end-caps of propylene oxide;
   wherein the amount of isobutylene oxide in the polyether polyol as a whole is from about 25 to 75 mole percent and the total amount of propylene oxide is from about 25 to 75 mole percent, the polyether polyol has at least two hydroxyl end-groups, the hydroxyl end-groups are primary, secondary, or tertiary, and the ratio of primary + secondary total hydroxyl is greater than about 0.50.

10. The polyurethane of claim 9 wherein the polyether polyol has two hydroxyl end-groups.

11. The polyurethane of claim 9 wherein the polyether polyol has three hydroxl end-groups.

12. The polyurethane of claim 9 wherein the chain extension agent is a diisocyanate.

13. The polyurethane of claim 12 wherein the diisocyanate is methylene bis(phenyl isocyanate).

14. The polyurethane of claim 9 wherein the ratio $$\frac{\text{primary + secondary}}{\text{total hydroxyl}}$$

in the polyether polyol is from about 0.60 to 0.90.

* * * * *